(12) United States Patent
Gotou (10) Patent No.: US 9,068,730 B2
(45) Date of Patent: Jun. 30, 2015

(54) EDGE LIGHT BACKLIGHT UNIT AND LIQUID CRYSTAL DISPLAY DEVICE INCLUDING SAME

(75) Inventor: Akira Gotou, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 275 days.

(21) Appl. No.: 13/805,020

(22) PCT Filed: May 23, 2011

(86) PCT No.: PCT/JP2011/061725
§ 371 (c)(1),
(2), (4) Date: Dec. 18, 2012

(87) PCT Pub. No.: WO2012/002065
PCT Pub. Date: Jan. 5, 2012

(65) Prior Publication Data
US 2013/0088893 A1 Apr. 11, 2013

(30) Foreign Application Priority Data
Jul. 1, 2010 (JP) .................................. 2010-150945

(51) Int. Cl.
*G02F 1/1333* (2006.01)
*F21V 7/04* (2006.01)
*F21V 21/00* (2006.01)
*F21V 8/00* (2006.01)

(52) U.S. Cl.
CPC .............. *F21V 21/00* (2013.01); *G02B 6/0088* (2013.01)

(58) Field of Classification Search
CPC ............................ F21V 21/00; G02B 6/0088
USPC .................................... 362/23, 235, 249, 330
See application file for complete search history.

(56) References Cited

U.S. PATENT DOCUMENTS

| | | | | |
|---|---|---|---|---|
| 7,490,963 | B2 * | 2/2009 | Fang et al. | 362/330 |
| 8,801,261 | B2 * | 8/2014 | Gotou | 362/616 |
| 2005/0225960 | A1 * | 10/2005 | Tsai | 362/23 |
| 2010/0188604 | A1 | 7/2010 | Ajichi | |

FOREIGN PATENT DOCUMENTS

| | | |
|---|---|---|
| JP | 06-308489 A | 11/1994 |
| JP | 2001-014923 A | 1/2001 |
| JP | 2001-034185 A | 2/2001 |
| JP | 2006-058741 A | 3/2006 |
| JP | 2010-113904 A | 5/2010 |
| WO | 2009/044584 A1 | 4/2009 |

OTHER PUBLICATIONS

Official Communication issued in International Patent Application No. PCT/JP2011/061725, mailed on Jun. 14, 2011.

* cited by examiner

*Primary Examiner* — Joseph L Williams
(74) *Attorney, Agent, or Firm* — Keating & Bennett, LLP (57) ABSTRACT

In order to accurately illuminate a lighting target with planar light having few nonuniformities, a backlight (2) is provided with a light guide plate (5) having multiple leg members (531) protruding from an attachment part (53), which is the surface opposite of an emission part (52), and a chassis (4) having holding units (411) into which the leg members (531) are inserted.

20 Claims, 10 Drawing Sheets

EDGE LIGHT BACKLIGHT UNIT AND LIQUID CRYSTAL DISPLAY DEVICE INCLUDING SAME

TECHNICAL FIELD

The present invention relates to a backlight unit that supplies light to a non-light-emitting display panel such as a liquid crystal display panel and the like, and to a liquid crystal display device that includes the backlight unit.

BACKGROUND ART

In recent years, there are many cases where a liquid crystal display device is used as a display device of a notebook computer monitor, a television receiver and the like. The liquid crystal display device includes a liquid crystal display panel, and a backlight unit that is disposed to oppose a rear surface of the liquid crystal display panel, wherein the liquid crystal display panel adjusts penetration ratio (penetration amount) of light from the backlight unit and displays an image on a front surface of the liquid crystal display panel.

The backlight unit is roughly classified into two kinds. One is a light guide plate type (edge-light type) that uses a light guide plate and inputs light from a side of the light guide plate, and the other is a direct type in which a light source is disposed to oppose a rear surface of a liquid crystal module. Request for thickness reduction and size reduction of the liquid crystal display device is increasing, and more and more liquid crystal display devices are employing the edge-light type that is a backlight unit thinner than the direct type backlight unit.

Figure 8:
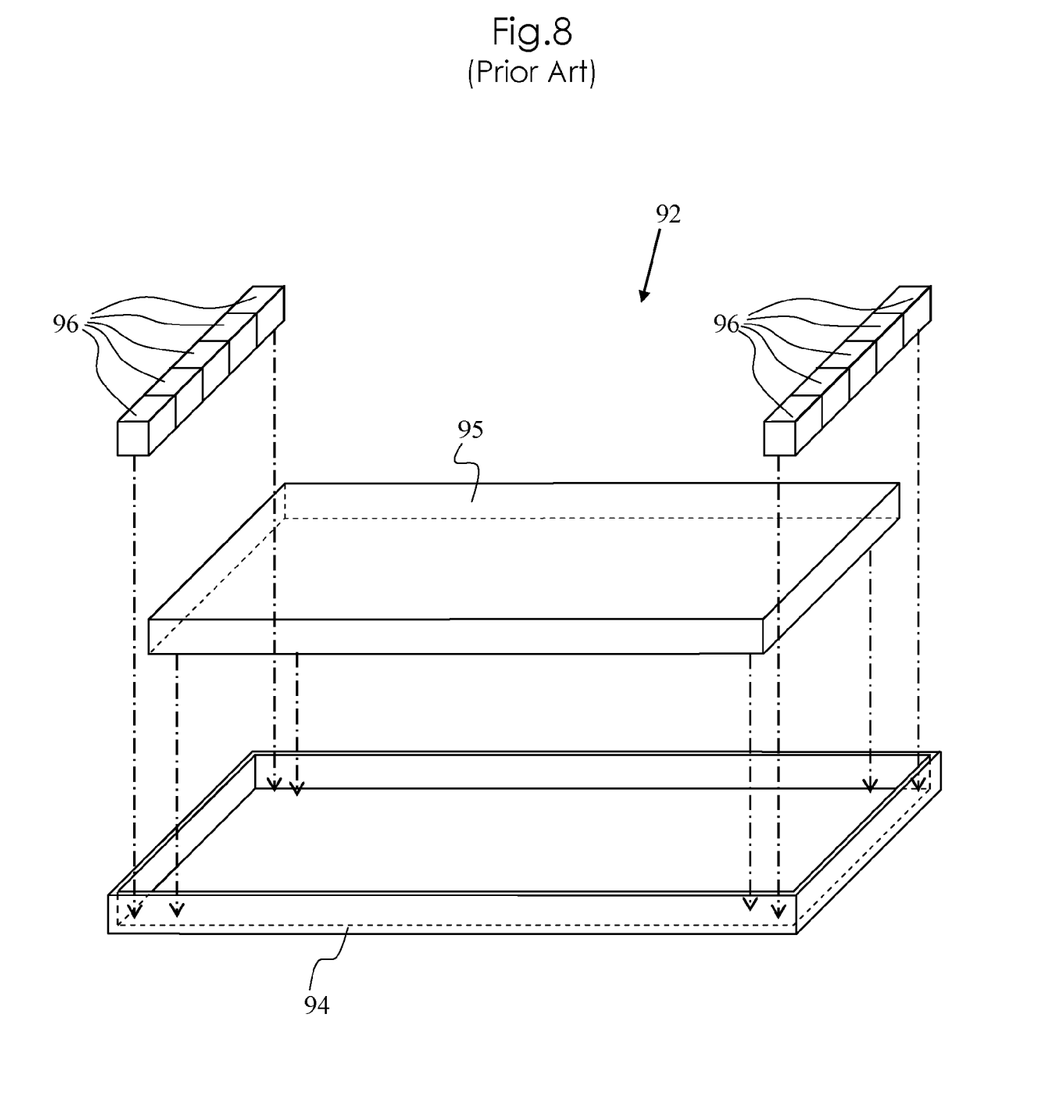
[FIG. 8] is an exploded perspective view of a conventional backlight unit used in a liquid crystal display device.

A conventional backlight unit is described with reference to drawings. FIG. 8 is an exploded perspective view of a conventional backlight unit that is used for a liquid crystal display device. A backlight unit 92 is a unit that outputs planar light to a rear surface of a liquid crystal display panel (not shown). As shown in FIG. 8, the backlight unit 92 includes: a backlight chassis 94; a plurality of LED lamps 96 that are light sources held by the backlight chassis 94; and a light guide plate 95 that is held by the backlight chassis 94 and outputs light from the LED lamp 96 as the planar light to the liquid crystal display panel. The light guide plate 95 is held by a side wall portion of the backlight chassis 94. Here, as shown in FIG. 8, the backlight unit 92 has a rectangular shape when viewed from front. And, the LED lamp 96 is disposed to output the light to both end surfaces of the light guide plate 95 in a long-edge direction (see JP-A-2001-14923 and JP-A-2001-34185).

However, there are many cases where a gap is formed between the backlight chassis 94 and the light guide plate 95. In these cases, it is impossible to position the light guide plate 95 with respect to the backlight chassis 94 with high accuracy, accordingly, the brightness of the light output from the backlight unit 92 declines and the light output position deviates.

Figure 9:
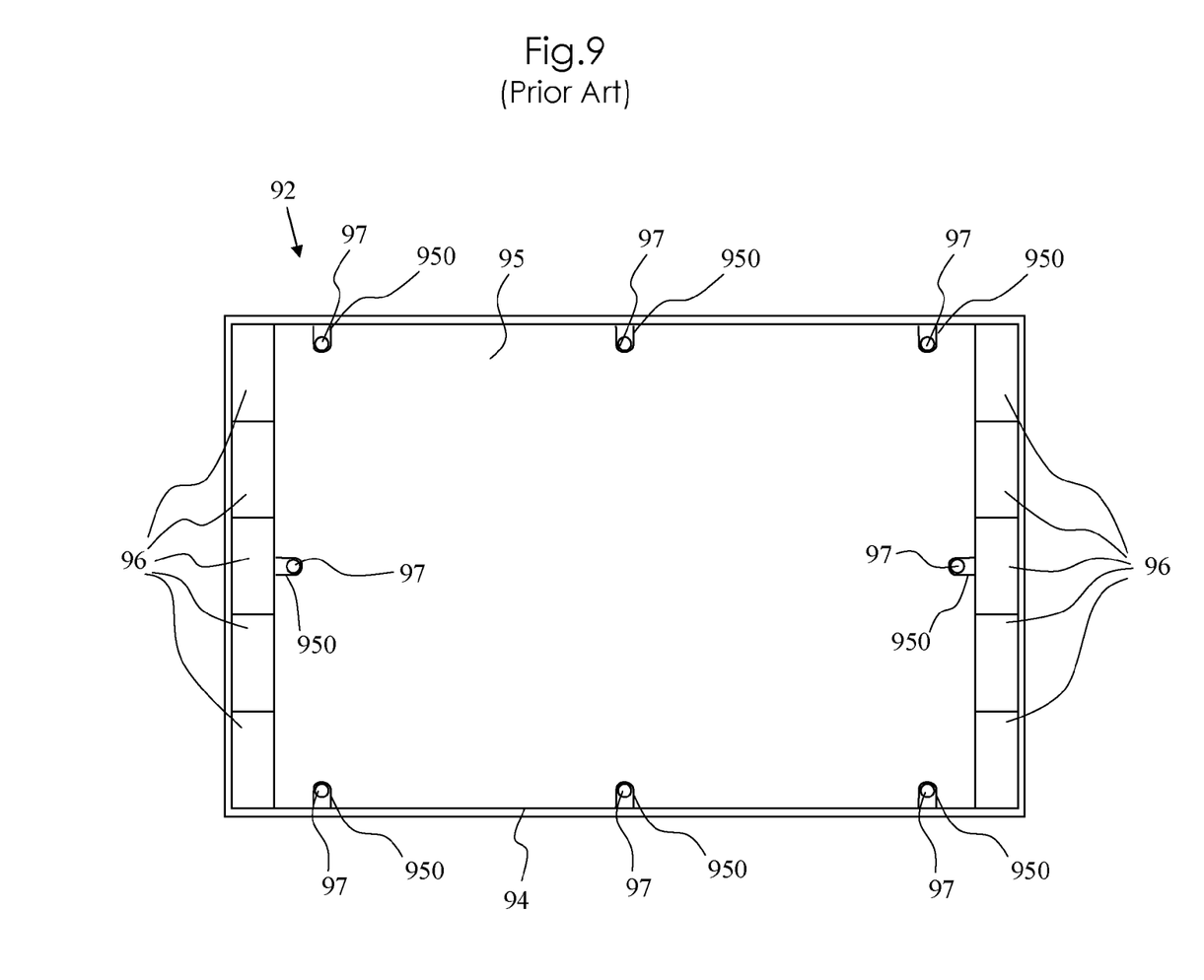
[FIG. 9] is a plan view of an improved version of the backlight unit shown in FIG. 8.

There is a backlight unit that has a structure for positioning the backlight unit 94 and the light guide plate 95 with high accuracy. FIG. 9 is a front view of an improved version of the backlight unit that is shown in FIG. 8. As shown in FIG. 9, there is the backlight unit 92 in which the light guide plate 95 is provided with a plurality of cutouts 950; and a stud pin 97 disposed in the backlight chassis 94 and the cutout 950 are applied to each other to be positioned. As described above, by using the plurality of cutouts 950 and the stud pins 97 disposed corresponding to the cutouts 950, it is possible to correctly position the backlight chassis 94 and the light guide plate 95, accordingly, it is possible to output correct planar light to the liquid crystal display panel (not shown).

CITATION LIST

Patent Literature

PLT1: JP-A-2001-14923
PLT1: JP-A-2004-34185

SUMMARY OF INVENTION

Technical Problem

Figure 10:
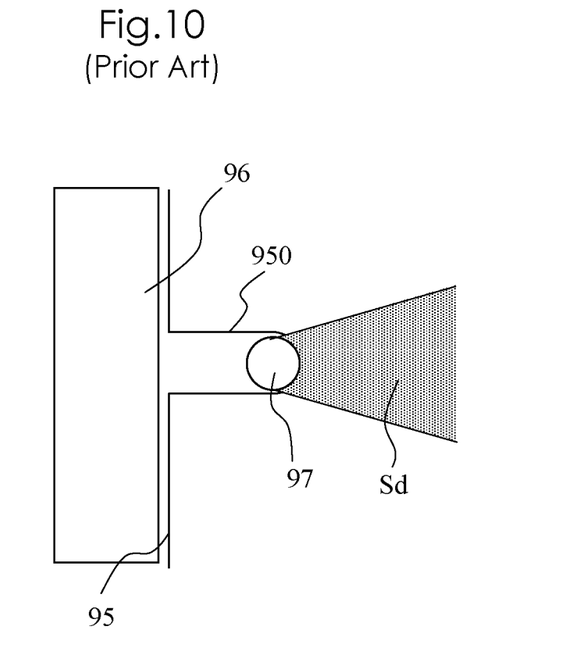
[FIG. 10] is an enlarged view of a portion where brightness unevenness is caused by a stud pin.

However, in the case where the positioning of the backlight chassis 94 and the light guide plate 95 is performed by using the cutout 950 and the stud pin 97, the light traveling in the light guide plate 95 is blocked and irregularly reflected because of influence of the cutouts 950 and the stud pint 97. As a result of this, brightness unevenness occurs in the planar light output from the light guide plate 95. The brightness unevenness caused by these cutout 950 and the stud pin 97 is described with reference to drawings. FIG. 10 is an enlarged view of a portion where the brightness unevenness is caused by the stud pin, and FIG. 11 is an enlarged view of a portion where the brightness unevenness is caused by the cutout.

As shown in FIG. 10, the stud pin 97 is disposed in the cutout 950, accordingly, when viewing the light guide plate 95 from front, the stud pin 97 is disposed in the rectangular shape of the light guide plate 95. In this state, when the light is output from the LED lamp, the stud pin 97 blocks the light, accordingly, as shown in FIG. 10, a V-shaped shadow Sd is formed. Because of this shadow, the brightness unevenness occurs in the planar light output from the backlight unit.

Figure 11:
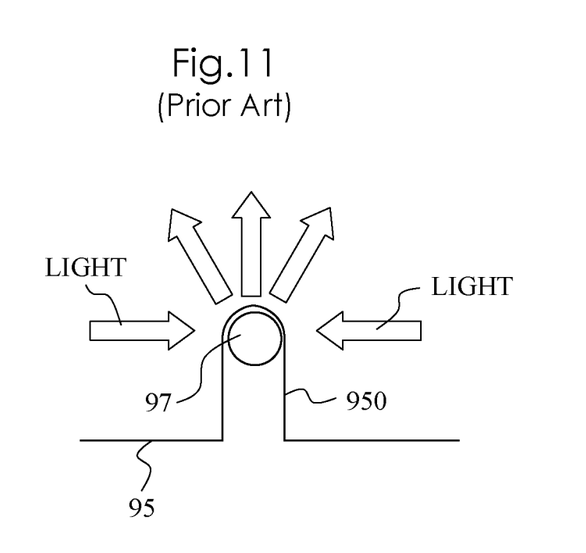
[FIG. 11] is an enlarged view of a portion where brightness unevenness is caused by a cutout.

Besides, as shown in FIG. 11, because of the forming of the cutout 950, the light in the light guide plate 95 is totally reflected by the cutout 950, accordingly, the brightness at the cutout 950 increases and the brightness unevenness occurs.

As described above, according to the light guide plate 95 that has the structure which easily causes the brightness unevenness, it becomes hard to perform optimum designing for alleviating the brightness unevenness of the output light.

To avoid this, it is an object of the present invention to provide a backlight unit that is easy to produce and assemble and able to output planar light having alleviated brightness unevenness to an illumination target with high accuracy, and a liquid crystal display device that uses the backlight unit.

Solution to Problem

To achieve the above object, the present invention is a backlight unit that includes: a chassis; a light source that is mounted in the chassis; and a rectangular parallelepiped light guide plate that is mounted in the chassis, receives light from the light source via an end surface, and outputs the light as planar light from a front output portion; wherein the light guide plate includes a plurality of leg members that protrude from a mounted portion that is a surface opposite to the output portion; and the chassis includes holding portions into which the leg members are inserted.

According to this structure, the light guide plate is a rectangular parallelepiped and the leg member, which is an engagement structure that engages with the chassis of the light guide plate, has a shape that protrudes outside the light guide plate, accordingly, it is unnecessary to dispose the engagement structure in front of the light source. Besides, the cutout for the positioning is unnecessary. According to this, the light from the light source is not blocked by the engagement structure, and the light from the light source is not unevenly reflected by the cutout, accordingly, it is possible to alleviate brightness unevenness of the planar light output from the output portion.

Besides, the light guide plate has the structure which includes the leg member that protrudes from the rectangular parallelepiped, accordingly, the structure is simple and the production is easy. Besides, the output portion of the light guide plate which outputs the received light as the planar light is a rectangular parallelepiped, accordingly, optimum designing of the light guide plate for alleviating the brightness unevenness of the planar light is easy.

Besides, by inserting the leg member into the holding portion, the light guide plate is positioned in the chassis with high accuracy. According to this, the light guide plate is able to output the planar light form the output portion to an illumination target with high accuracy.

In the above structure, the light guide plate and the plurality of leg members may be formed integrally with each other, or the plurality of leg members may be attachable to and detachable from the light guide plate. If the light guide plate and the leg members are formed integrally with each other, the production of the light guide plate is easy. Besides, in a case where the light guide plate and the leg member are structured to be attachable and detachable, even in a case where it is necessary to change the position of the holding portion of the chassis, it is sufficient to change the position of the leg member of the light guide plate, accordingly, it is easy to deal with the modification of the chassis.

In the above structure, the plurality of leg members may be formed to be not-insertable into the holding portion when the light guide plate is rotated 180° about an axis that passes through a center of the mounted portion and meets the mounted portion at right angles.

According to this structure, only when the light guide plate is in a direction (direction that is not rotated 180°) that is correct with respect to the chassis, it is possible to mount the light guide plate in the chassis. According to this, even if the direction is not strictly confirmed, the light guide plate is mounted in the chassis in the correct direction. According to this, it is possible to mount the optimized light guide plate in the chassis in the suitable direction, and it is possible to alleviate the brightness decline and brightness unevenness of the planar light output from the light guide plate.

In the above structure, a sectional shape, which is obtained by cutting, along a surface parallel to the mounted portion, at least one set of leg members disposed at symmetrical positions with respect to the center of the mounted portion, may be a shape that is not point-symmetrical.

According to this structure, only when the light guide plate is in the direction (direction that is not rotated 180°) that is correct with respect to the chassis, it is possible to mount the light guide plate in the chassis. According to this, even if the direction is not strictly confirmed, the light guide plate is mounted in the chassis in the correct direction. According to this, it is possible to mount the optimized light guide plate in the chassis in the suitable direction, and it is possible to alleviate the brightness decline and brightness unevenness of the planar light output from the light guide plate.

In the above structure, the backlight unit may include two or more kinds of leg members that have sectional shapes which are obtained by cutting along the surface parallel to the mounted portion and are different from each other.

According to this structure, only when the light guide plate is in the direction (direction that is not rotated 180°) that is correct with respect to the chassis, it is possible to mount the light guide plate in the chassis. According to this, even if the direction is not strictly confirmed, the light guide plate is mounted in the chassis in the correct direction. According to this, it is possible to mount the optimized light guide plate in the chassis in the suitable direction, and it is possible to alleviate the brightness decline and brightness unevenness of the planar light output from the light guide plate.

In the above structure, the light guide plate may have a structure that is dividable into a plurality of light guide members; and the light guide members each may have two or more leg members. According to this structure, it is possible to perform area control in which the light guide plate outputs light that has brightnesses different for the plurality of regions. Besides, it is possible to assemble the light guide plate by only inserting the leg member into the holding portion. According to this, the assembly of the light guide plate is easy.

In the above structure, the holding portion may be a through-hole, or a closed concave hole.

Besides, the backlight unit according to the present invention is usable as a planar illumination device of a liquid crystal display device. Besides, without being limited to the liquid crystal display device, the backlight unit according to the present invention is usable as a rear surface illumination device of a transmissive type image display device that does not emit light by itself.

Advantageous Effects of Invention

According to the present invention, it is possible to provide a backlight unit that is easy to produce and assemble and able to output planar light having less brightness unevenness to an illumination target with high accuracy, and a liquid crystal display device that uses the backlight unit.

DESCRIPTION OF EMBODIMENTS

Figure 1:
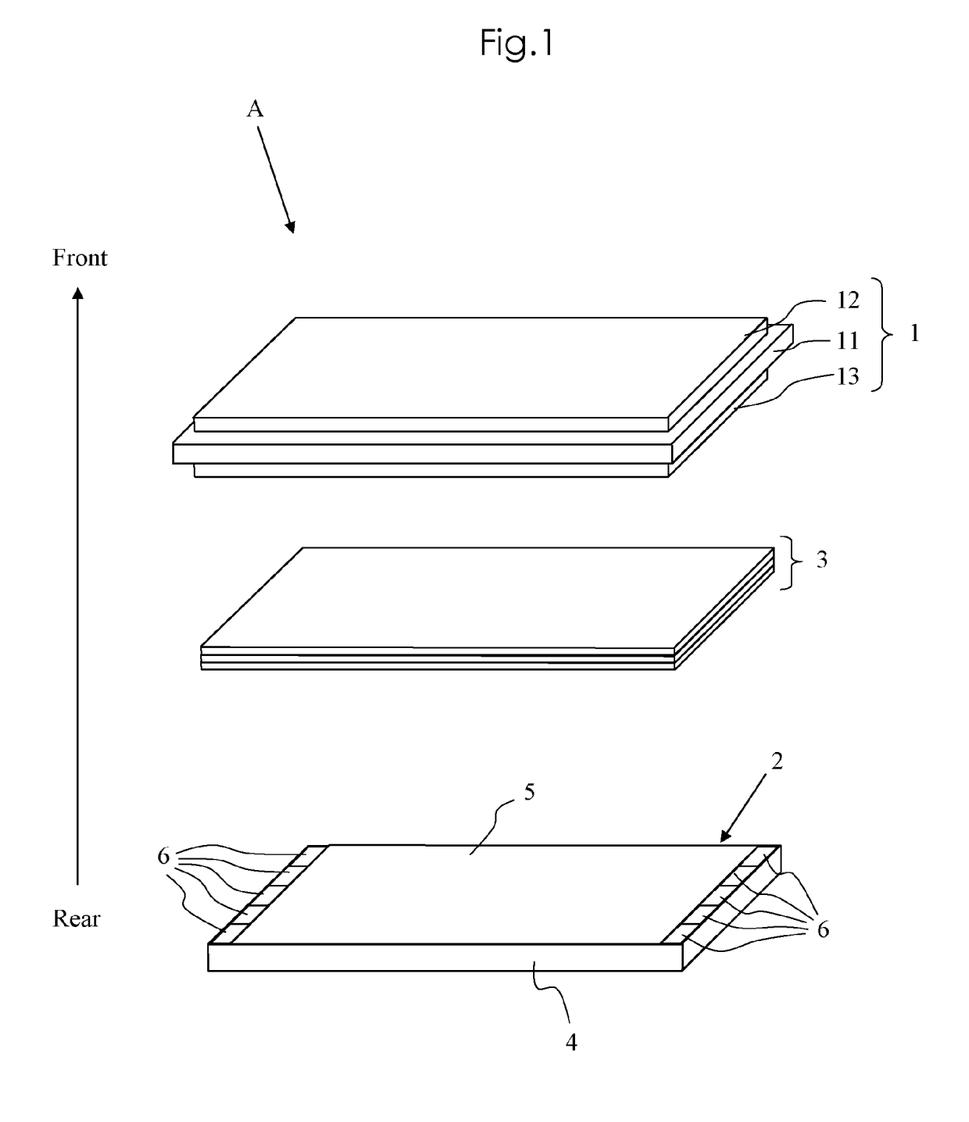
[FIG. 1] is an exploded perspective view of an example of a liquid crystal display device that includes a backlight unit according to the present invention.

Hereinafter, embodiments of the present invention are described with reference to the drawings. FIG. 1 is an exploded perspective view of an example of a liquid crystal display device that includes a backlight unit according to the present invention. As shown in FIG. 1, a liquid crystal display device A includes: a liquid crystal display panel 1; and a backlight unit 2 that is disposed on a rear surface of the liquid crystal display panel 1.

The liquid crystal display panel 1 has: a liquid crystal panel 11 in which liquid crystal is injected; a light polarization plate 12 that is attached to a front surface (viewer side) of the liquid crystal panel 11; and a light polarization plate 13 that is attached to a rear surface (backlight unit 2 side) of the liquid crystal panel 11. The liquid crystal panel 11 includes: an array substrate that includes switching devices such as a TFT (thin film transistor) and the like; an opposite substrate that is disposed to oppose the array substrate and is provided with a color filter; and liquid crystal that is injected between the array substrate and the opposite substrate (none of them are shown). Here, the liquid crystal panel 1 may have a structure in which the color filter is formed on the array substrate and a transparent electrode is formed on the opposite substrate.

As shown in FIG. 1, in the liquid crystal display device A, an optical sheet unit 3 is disposed between the liquid crystal display panel 1 and the backlight unit 2. In the liquid crystal display device A shown in FIG. 1, the optical sheet unit 3 includes three optical sheets, which however is not limiting, and may include more sheets, or may be composed of a smaller number of sheets. The optical sheet unit 3 includes, for example, a diffusion sheet, a lens sheet and the like. The diffusion sheet diffuses input light inside. In other words, the light entering the diffusion sheet is diffused in the diffusion sheet and is output as planar light that has less brightness unevenness. The lens sheet is a sheet that deflects (collects light) a light radiation characteristic; entering light is collected, whereby light emission brightness per unit area improves. Here, there is a case where an optical sheet other than these is used.

The light output from the backlight unit 2 enters the optical sheet unit 3. The light entering the optical sheet unit 3 is diffused and collected, whereby the brightness unevenness is reduced, the light emission brightness is raised, and the light enters the liquid crystal display panel 1.

Figure 2:
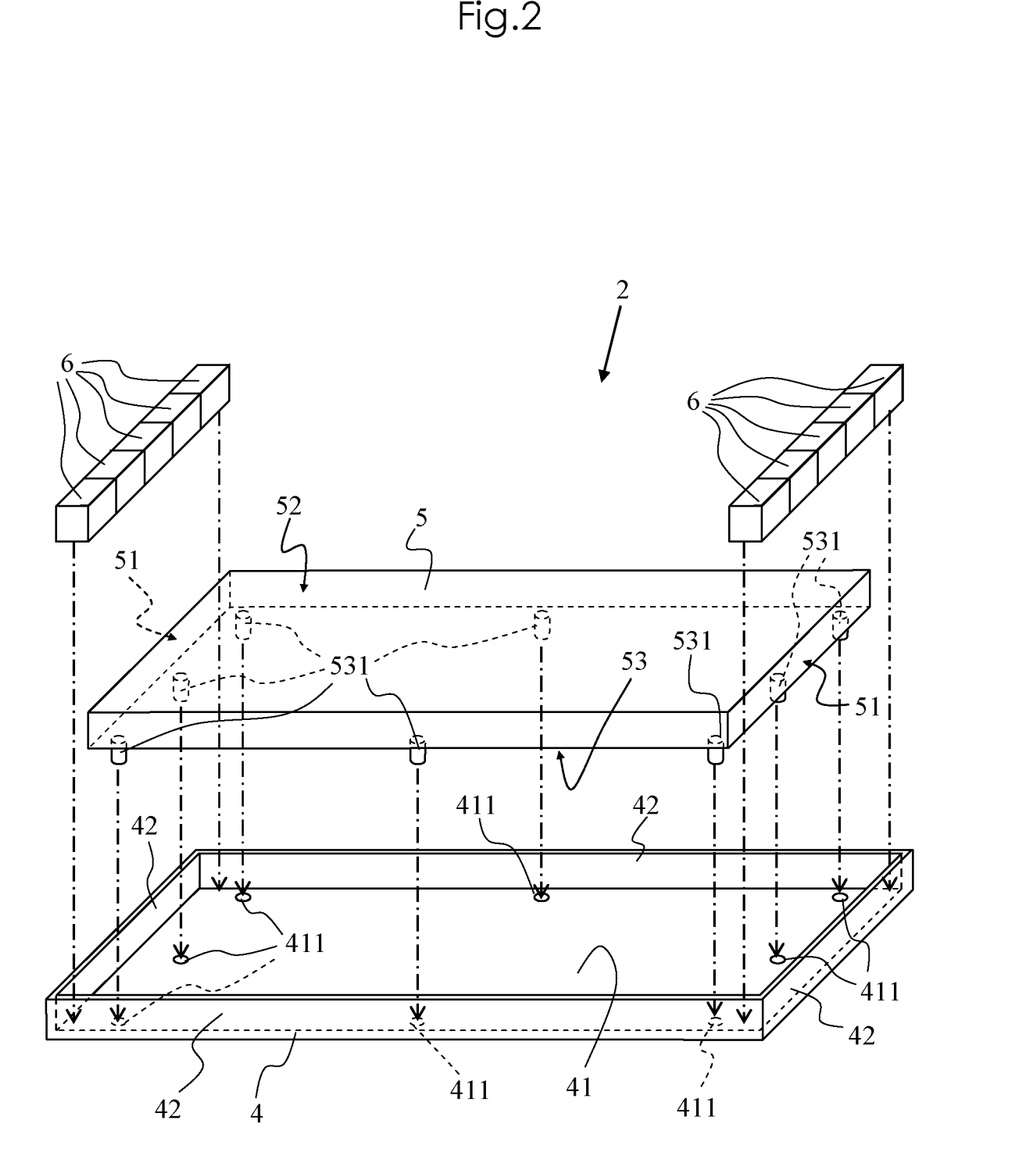
[FIG. 2] is an exploded perspective view of a backlight unit used in the liquid crystal display device shown in FIG. 1.
Figure 3:
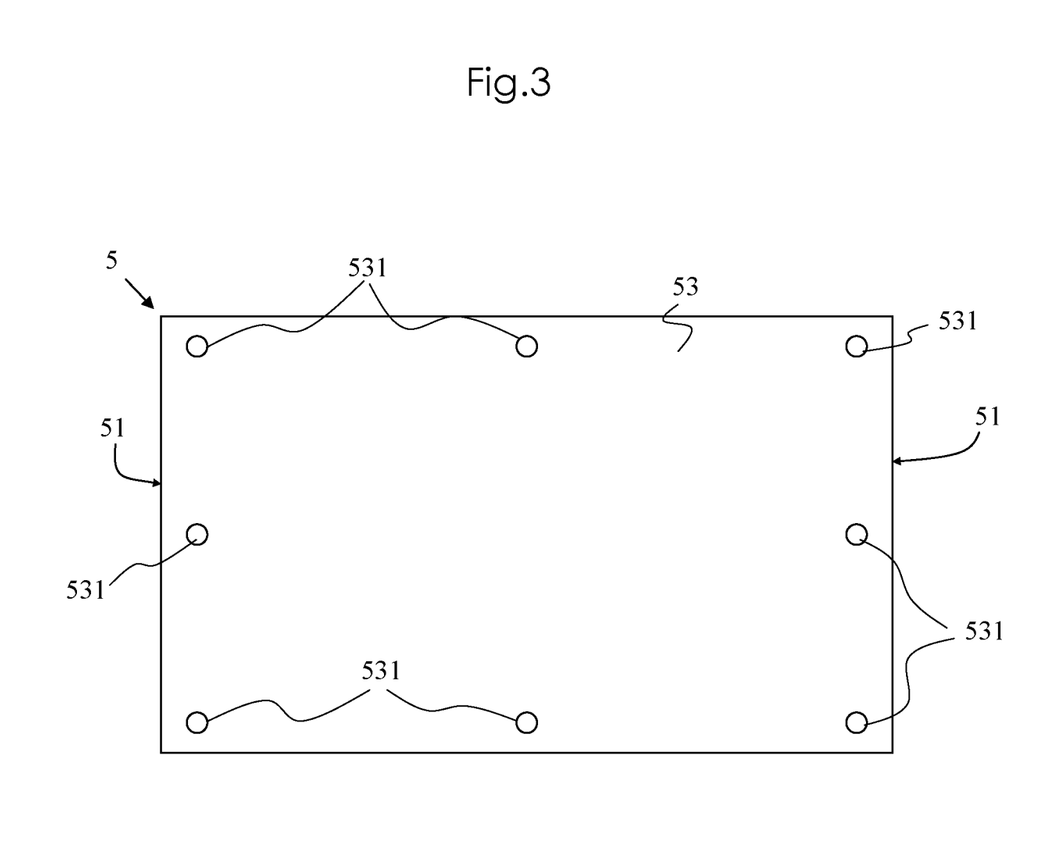
[FIG. 3] is a rear view of the backlight unit shown in FIG. 2.

The backlight unit 2 is described in detail with reference to drawings. FIG. 2 is an exploded perspective view of a backlight unit used in the liquid crystal display device shown in FIG. 1, and FIG. 3 is a rear view of a light guide plate that is used in the backlight unit shown in FIG. 2. The backlight unit 2 is a backlight unit of edge-light type. As shown in FIG. 2, the backlight unit 2 includes: a backlight chassis 4 that is a chassis; a light guide plate 5 that is held in the backlight chassis 4; and a plurality of LED lamps 6 (here, five each on the left and right, that is, ten in total) that are light sources held in the backlight chassis 4 and output light to the light guide plate 5.

As shown in FIG. 2, the backlight chassis 4 includes a rectangular rear surface portion 41 and a side wall portions 42 that are formed to rise from four edges of the rear surface portion 41. A reflection sheet (not shown) is mounted to cover the rear surface portion 41 and side wall portions 42 of the backlight chassis 4. The reflection sheet is intended to reflect and return light leaking from the light guide plate 5 back to the light guide plate 5, and usually, a white sheet is used. It is preferable that the reflection sheet is fixed to the backlight chassis 4 not to deviate upward. Because of this, as the fixing method for the reflection sheet, for example, there is a method for bonding a rear surface of the reflection sheet to the rear surface portion 41 and the side wall portions 42 by means of a double-adhesion type adhesive sheet.

The light guide plate 5 is a transparent rectangular parallelepiped plate-shaped member. The light guide plate 5 is provided, on side surfaces, with light reception portions 51 that receive the light from the LED lamp 6. Here, in the light guide plate 5, both end surfaces in a long-edge direction are the light reception portions 51. Besides, one of main surfaces of the light guide plate 5 defines an output portion 52 from which the light input from the light reception portion 51 exits. Besides, a surface opposite to the output portion 52 defines a mounted portion 53 that opposes the rear surface portion 41 of the backlight chassis 4. The light guide plate 5 and the LED lamp 6 are mounted in the backlight chassis 4 where the reflection sheet is disposed.

As shown in FIG. 3, the mounted portion 53 of the light guide plate 5 is provided with leg members 531. The leg member 531 is a cylindrical member that meets the mounted portion 53 having a rectangular flat surface at right angles. Besides, the leg members 531 are disposed at four corners and at intermediate portions of respective edges of the rectangular mounted portion 53. On the other hand, the rear surface portion 41 of the backlight chassis 4 is provided with hold members 411, that is, through-holes, at positions which correspond to the leg members 531 when the light guide plate 5 is disposed in the backlight chassis 4. Besides, the reflection sheet also is provided with a through-hole which the leg member 531 penetrates.

The leg member 531 penetrates the through-hole of the reflection sheet and the holding portion 411 of the rear surface portion 41, whereby the light guide plate 5 is positioned at a proper position of the backlight chassis 4. Besides, the leg member 531 is inserted into the hold member 411, accordingly, the light guide plate 5 is unlikely to deviate. According to this, it is possible to reduce fixing members such as an adhesive, an adhesive sheet and the like that are intended to fix the light guide plate 5 to the backlight chassis 4. Here, it is preferable that the leg member 531 has enough strength such that the leg member 531 is not deformed nor broken even if force acts on the light guide plate 5.

The leg member 531 may be formed integrally with the light guide plate 5 or may be detachably mounted on the light guide plate 5. Besides, the leg member 531 is a cylindrical member, but may be a pillar member that is tapered to become slender toward its tip end. By tapering the leg member 531, it is possible to insert the leg member 531 into the holding portion 411 without performing fine adjustment. According to this, it is possible to easily mount the light guide plate 5 in the backlight chassis 4. In the above backlight unit 2, the light guide plate 5 includes the eight leg members 531; however, this is not limiting, and may include more or less than eight in accordance with the size of the light guide plate 5 if it is possible to stably dispose the light guide plate 5 in the backlight chassis 4.

Figure 4:
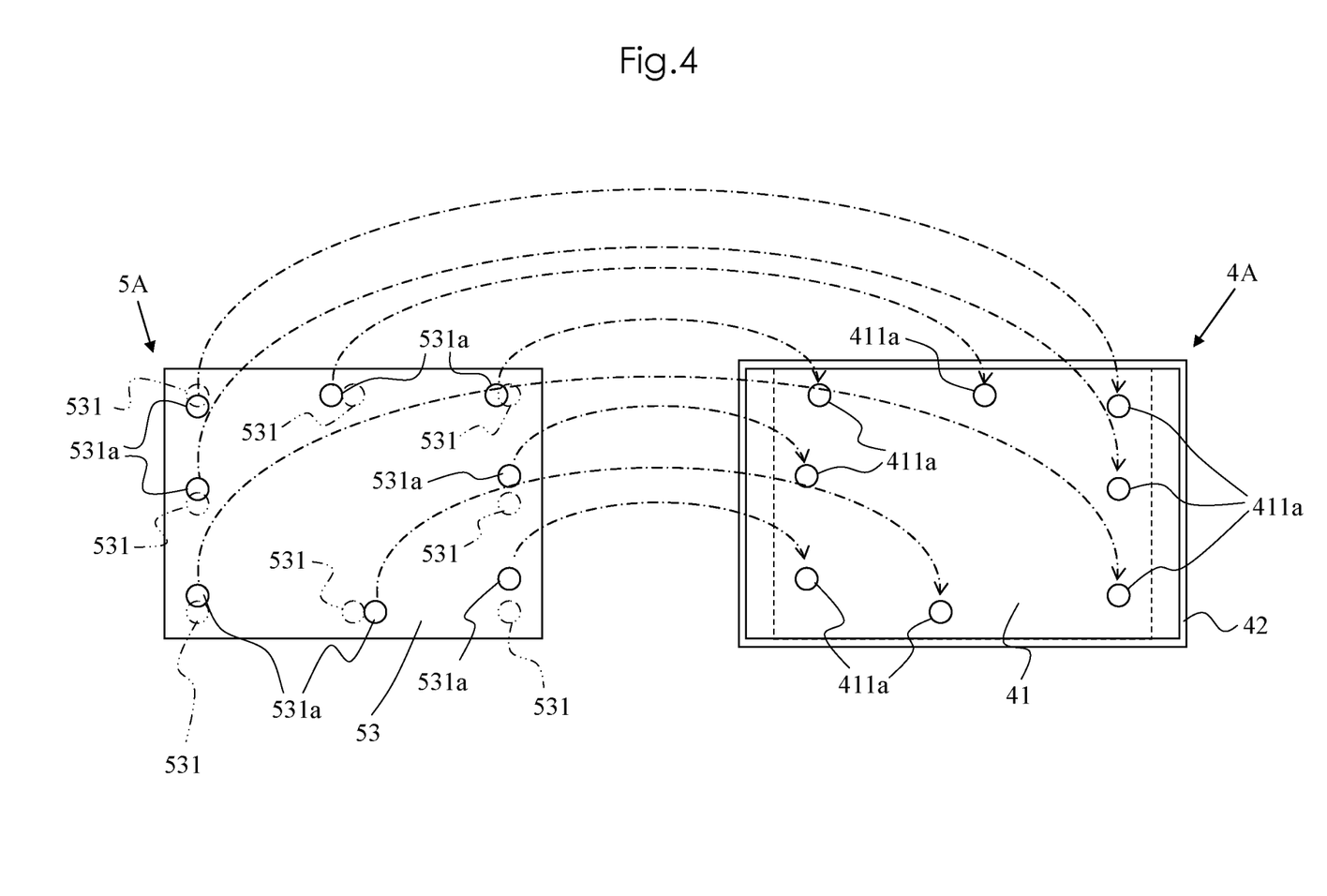
[FIG. 4] is a schematic view of another example of a light guide plate and a backlight chassis of a backlight unit according to the present invention.

Another example of the backlight unit according to the present invention is described with reference to a drawing. FIG. 4 is a schematic view of another example of a light guide plate and a backlight chassis of the backlight unit according to the present invention. A light guide plate 5A shown in FIG. 4 has the same structure as the light guide plate 5 shown in FIG. 3 except that the position of a leg member 531a is different. Besides, a backlight chassis 4A has the same structure as the backlight chassis 4 shown in FIG. 2 except that the position of a holding portion 411a is different. Here, in FIG. 4, the substantially same portions are indicated by the same reference numbers, and detailed description of the same portions is skipped. Besides, for comparison with the light guide plate 5 shown in FIG. 3, the leg member 531 is indicated by means of a two-dot-one-bar line. Besides, a corresponding relationship between the leg member 531a and the holding portion 411a is indicated by means of a one-dot-one-bar line.

As shown in FIG. 4, the leg members 531a are disposed near the four corners and near the central areas of the respective edges of the rectangular mounted portion 53. However, unlike the light guide plate 5, the eight leg members 531a are disposed such that the positions of the respective leg members 531a do not become point-symmetrical with respect to the center of the mounted portion 53. And, the rear surface portion 41 of the backlight chassis 4 is provided with the holding portion 411a at the position that corresponds to the leg member 531a when the direction of the light guide plate 5A is a correct mount direction. When the direction of the light guide plate 5A is correct with respect to the backlight chassis 4A, the leg member 531a is inserted into the holding portion 411a, and the light guide plate 5A is positioned and mounted in the backlight chassis 4A.

In a case where the light guide plate 5A rotates 180° about an axis that passes through the center of the mounted portion 53 and meets the mounted portion 53 at right angles, the leg member 531a and the holding portion 411a do not overlie each other when viewed from front, accordingly, the leg member 531a is not insertable into the holding portion 411a. In other words, the light guide plate 5A is mountable in the backlight chassis 4A in the correct direction only. According to this, without strictly checking the direction of the light guide plate 5A, the light guide plate 5A is mountable in the backlight chassis 4A in the correct direction.

Figure 5:
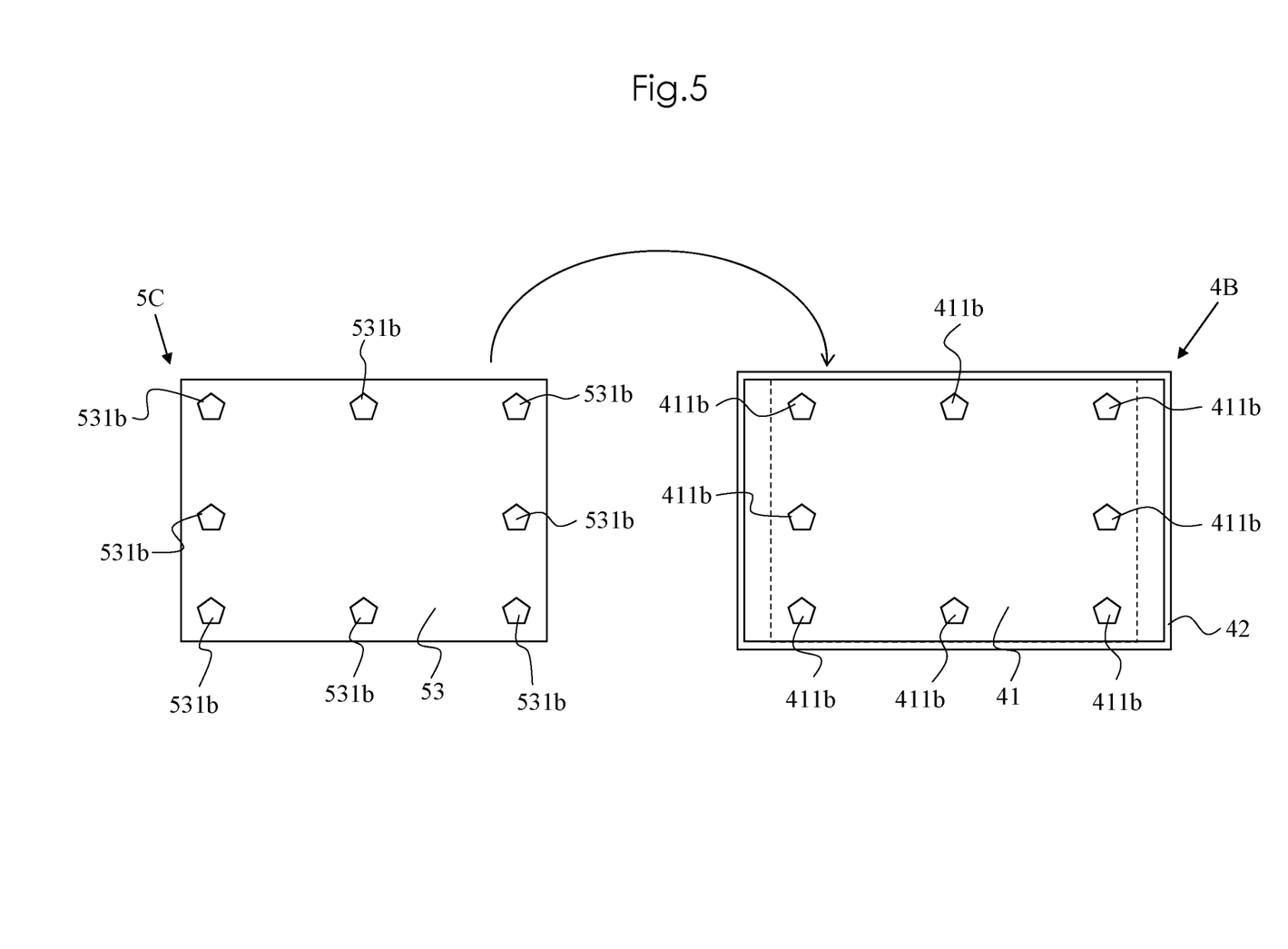
[FIG. 5] is a schematic view of another example of a light guide plate and a backlight chassis.

Still another example of the backlight unit according to the present invention is described with reference to a drawing. FIG. 5 is a schematic view of another example of a light guide plate and a backlight chassis of the backlight unit. A light guide plate 5B shown in FIG. 5 has the same structure as the light guide plate 5 shown in FIG. 3 except that the light guide plate 5B includes a leg member 531b. Besides, a backlight chassis 4B has the same structure as the backlight chassis 4 shown in FIG. 2 except that the shape of a holding portion 411b of the backlight chassis 4b is different. The substantially same portions are indicated by the same reference numbers, and detailed description of the same portions is skipped.

As shown in FIG. 5, the leg members 531b are disposed at the four corners and in the central areas of the respective edges of the mounted portion 53. Here, as described above, the position of the leg member 531b is the same as the leg member 531 of the light guide plate 5. And, a section shape cut along the plane parallel to the mounted portion 53 of the leg member 531b is a regular pentagon. Besides, the rear surface portion 41 of the backlight chassis 4B is provided, at the position corresponding to the leg member 531b of the light guide plate 5B, with the holding portion 411b that has the same regular pentagon as the sectional shape of the leg member 531b. Only when the light guide plate 5B is in the correct direction with respect to the backlight chassis 4B, the leg member 531b is inserted into the holding portion 411b, and the light guide plate 5B is positioned and held in the backlight chassis 4B with high accuracy.

In a case where the light guide plate 5B rotates 180° about the axis that passes through the center of the mounted portion 53 and meets the mounted portion 53 at right angles, the leg members 531b each move to positions that are symmetrical with the center of the mounted portion 53. At this time, the sectional shape of the leg member 531b is the regular pentagon and is not point-symmetrical. And, the shapes of the leg member 531b and the holding portion 411b are rotated 180° from each other to be in a reverse relationship with each other. Accordingly, the leg member 531b is not insertable into the holding portion 411b. In other words, the light guide plate 5B is mountable in the backlight chassis 4B in the correct direction only. According to this, without strictly checking the direction of the light guide plate 5B, the light guide plate 5B is mountable in the backlight chassis 4B in the correct direction.

Here, the example is described, in which in the above backlight unit, the sectional shape of the leg member 531b and the shape of the holding portion 411b are the regular pentagons; however, this is not limiting, and a shape, which is a triangle, a fan shape and the like that are not point-symmetrical (do not match each other when the light guide plate is rotated 180° as described above), may be widely usable. Besides, in the above backlight unit, the sectional shapes of all the leg members 531b and the shape of the holding portion 411b are the regular pentagons; however, this is not limiting, and even if the shape of at least one set of the leg member positions that are symmetrical with respect to the center of mounted portion 53 and the shape of the holding portion 411b corresponding to this leg member are shapes that are not point-symmetrical, the same effects are obtainable. In other words, without strictly checking the light guide plate, the light guide plate is mountable in the backlight chassis in the correct direction.

Figure 6:
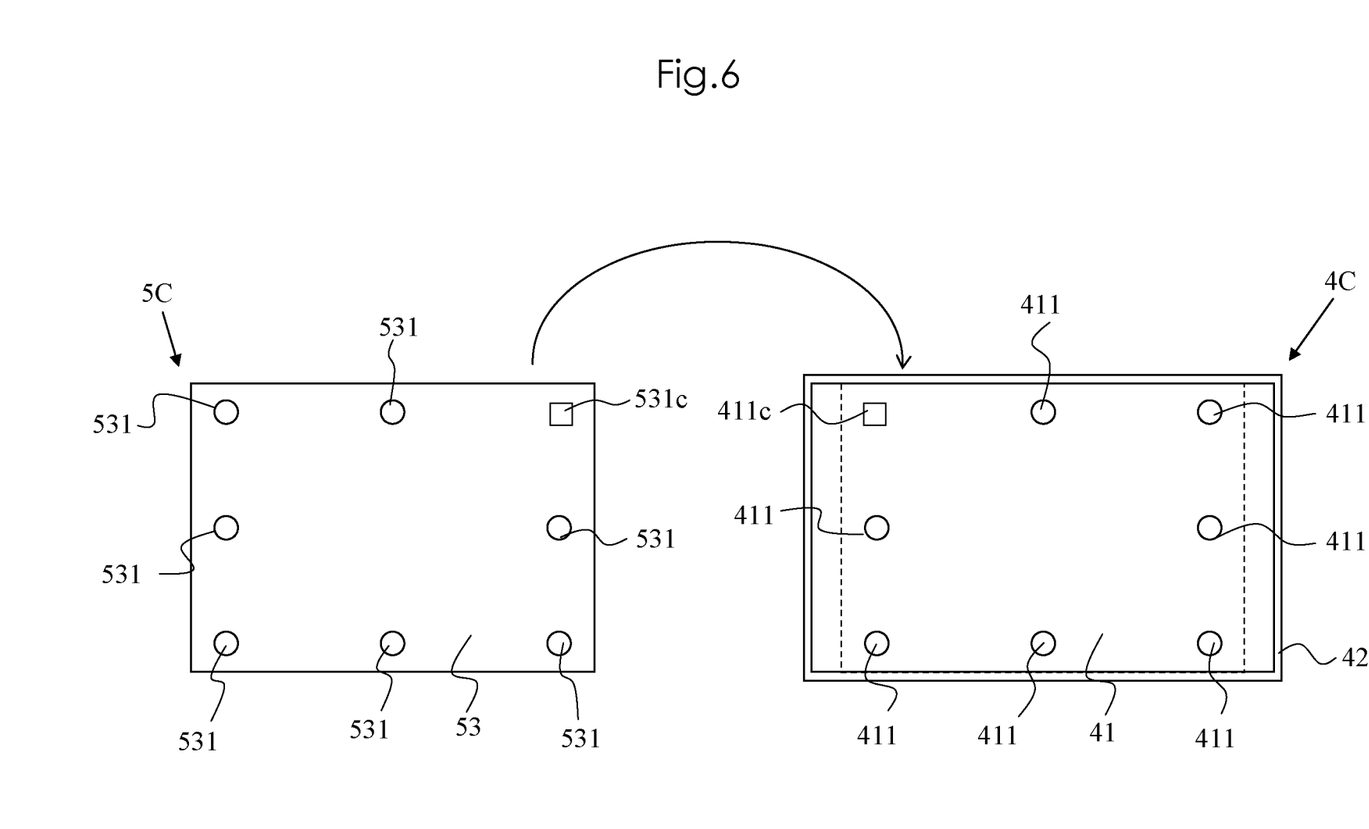
[FIG. 6] is a schematic view of another example of a light guide plate and a backlight chassis.

Still another example of the backlight unit according to the present invention is described with reference to a drawing. FIG. 6 is a schematic view of another example of a light guide plate and a backlight chassis of the backlight unit. A light guide plate 5C shown in FIG. 6 has the same structure as the light guide plate 5 shown in FIG. 3 except that one of the eight leg members 531 is a leg member 531c. Besides, a backlight chassis 4C has the same structure as the backlight chassis 4 shown in FIG. 2 except that the shape of a holding portion 411c of the backlight chassis 4C is different. The substantially same portions are indicated by the same reference numbers, and detailed description of the same portions is skipped.

As shown in FIG. 6, the light guide plate 5C includes the leg member 531c in an upper right area of the mounted portion 53 when viewed from rear. And, the leg members 531 are disposed at the remaining corners and in the central areas of the respective edges of the mounted portion 53. Here, as described above, the positions of the leg member 531c and the leg member 531 are the same as the leg member 531 of the light guide plate 5. And, the rear surface portion 41 of the backlight chassis 4C is provided, in an upper left area when viewed from front, with the holding portion 411c. Besides, at the positions corresponding to the remaining leg members 531, the same holding portions 411 as in the backlight chassis 4 are formed. The sectional shape of the leg member 531c cut along the plane parallel to the mounted portion 53 is a square. Likewise, the shape of the hold member 411c also is a square. As shown in FIG. 6, when the direction of the light guide plate 5C is correct with respect to the backlight chassis 4C, the leg member 531c corresponds to the holding portion 411c, and the light guide plate 5C is positioned and held in the backlight chassis 4C with high accuracy.

In a case where the light guide plate 5C rotates 180° about the axis that passes through the center of the mounted portion 53 and meets the mounted portion 53 at right angles, the leg member 531c opposes the holding portion 411 at a lower right portion when viewed from front. At this time, the sectional shape of the leg member 531c is the square and the shape of the holding portion 411 at the lower right portion is the circle, accordingly, the leg member 531c is not insertable into the holding portion 411. Likewise, the leg member 531, which opposes the holding portion 411c because of the rotation, has the circular sectional shape that is a shape different from the square holding portion 411c, accordingly, is not insertable. In other words, the light guide plate 5C is positioned and held in the backlight chassis 4C in the correct direction only with high accuracy. According to this, without strictly checking the direction of the light guide plate 5C, the light guide plate 5C is mountable in the backlight chassis 4C in the correct direction.

Here, the sectional shape of the leg member 531 is the circle and the sectional shape of the leg member 531c is the square, accordingly, when the sectional shape of the leg member 531 is larger than the sectional shape of the leg member 531c, the leg member 531c is insertable into the holding portion 411. Even in this case, the leg member 531 is not insertable into the holding portion 411c. In a case where the section of the leg member 531 is smaller than the section of the leg member 531c, reversely, even if the leg member 531 is insertable into the holding portion 411c, the leg member 531c is not insertable into the holding portion 411. In other words, irrespective of the size relationship between the leg member 531c and the leg member 531, the light guide plate 5C is mountable in the backlight chassis 4C in the correct direction.

Here, in the above description, the example is described, which includes one leg member that has the different sectional shape; however, this is not limiting, and the light guide plate may have a structure that includes two or more kinds of leg members whose sectional shapes are different from one another. At this time, of the sets of the leg members that are disposed symmetrically with respect to the center of the mounted portion, at least one set is a set of leg members that has sectional shapes different from each other.

Further, in the above example, to prevent the leg member from being inserted into the holding portion when the light guide plate rotates, the sectional shape of the leg member is modified; however, the sectional shape may be the same, while the sectional size may be modified. In this case as well, the leg member having a large sectional shape is not insertable into the holding portion into which the leg member having a small sectional shape is inserted. According to this, only when the light guide plate is in the correct direction, the light guide plate is positioned and held in the backlight chassis with high accuracy.

Figure 7:
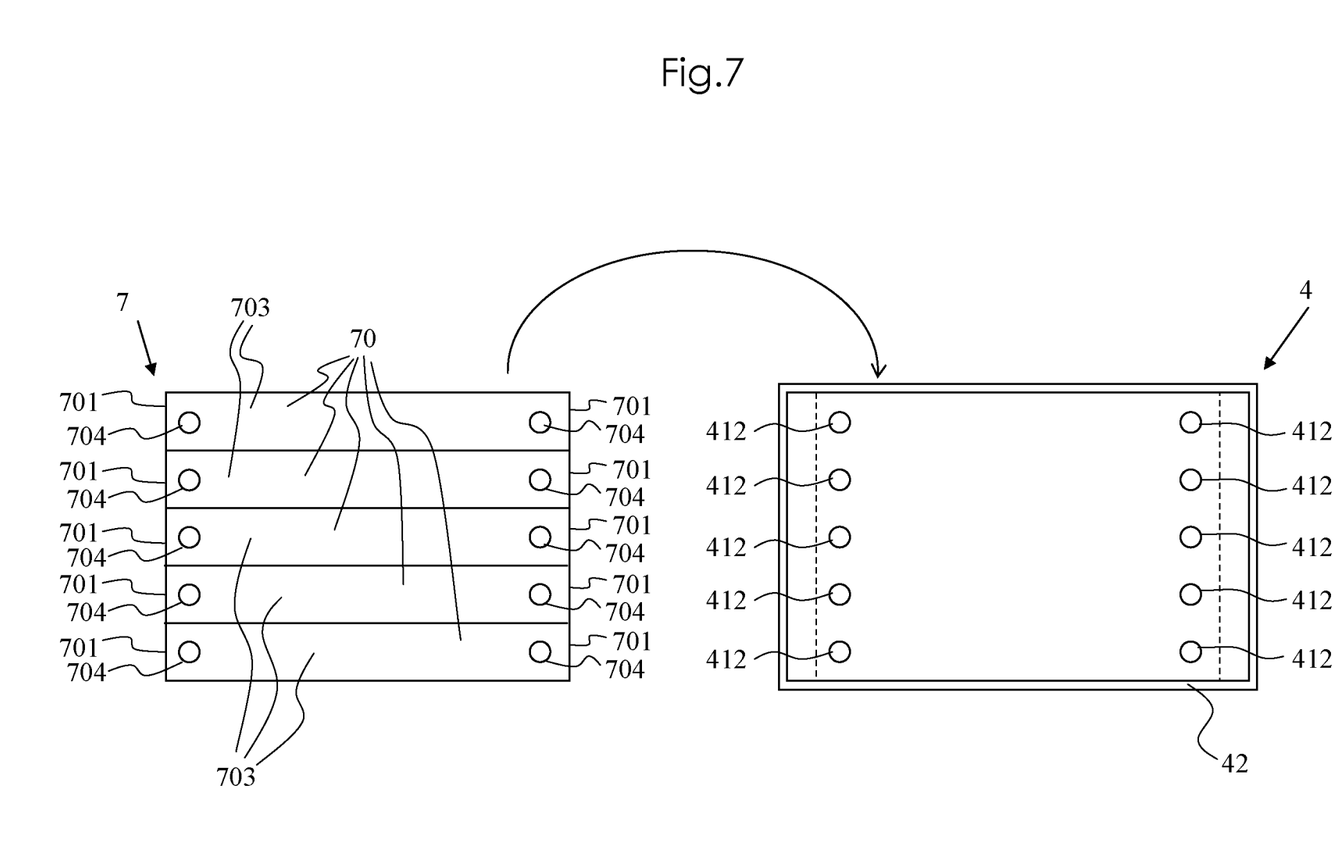
[FIG. 7] is a schematic view of another example of a light guide plate and a backlight chassis.

Still another example of the backlight unit according to the present invention is described with reference to a drawing. FIG. 7 is a schematic view of another example of a light guide plate and a backlight chassis of the backlight unit. A light guide plate 7 shown in FIG. 7 includes a plurality of light guide members 70 (here, five; however, this is not limiting), and the light guide members 70 are ranged and disposed in the backlight chassis 4.

The light guide members 70 are a transparent rectangular parallelepiped plate-shaped member and ranged in a short-edge direction to compose the light guide plate 7. In the light guide member 70, a side surface defines a light reception portion 701 that receives the light from the LED lamp 6. Here, in the light guide member 70, both end surfaces in a long-edge direction are the light reception portions 701. Besides, one of main surfaces of the light guide member 70 defines an output portion from which the light received by light reception member 701 exits. Besides, a surface opposite to the output portion defines a mounted portion 703 that opposes the rear surface portion 41 of the backlight chassis 4.

As shown in FIG. 7, the light guide member 701 is provided, near both end portions in a long-edge direction of the mounted portion 703, with leg members 704 that protrude in a direction that meets the mounted portion 703 at right angles. The rear surface portion 41 of the backlight chassis 4 is provided, at positions that correspond to the respective leg members 704, with holding portions 412, that is, through-holes into which the leg members 704 are inserted when the light guide members 70 are ranged and disposed in the backlight chassis 4. By inserting the leg members 701 into the holding portions 412 to range and dispose the light guide members 70, it is possible to easily form the light guide plate 7 in the backlight chassis 4.

Besides, by adjusting brightness of the light from the LED lamp 6 for every light guide member 70, it is possible to perform area control in which the light having the brightness different for every region is output. Here, by adding the features of the above shape, disposition, size and the like to the leg member 704 and the holding portion 412, it is possible to dispose the light guide member 70 in the backlight chassis 4 in the correct direction. Here, illustration and description are skipped; however, a reflection sheet is disposed between the light guide member 70 and the backlight chassis 4. And, the leg member 704 penetrates a through-hole that is formed through the reflection sheet.

Here, the holding portion of the backlight chassis in each of the above embodiments is the through-hole formed through the rear surface portion 41; however, may be a closed hole other than the through-hole. For example, if the backlight chassis is formed of a metal plate, it is possible to produce by means of extrusion molding of the metal plate. In addition, besides this, a method for forming a hole into which the leg member is smoothly insertable may be used.

In the backlight unit described in each of the above embodiments, the light guide plate (or the light guide member) has the rectangular parallelepiped shape, and the leg member, which is the engagement structure engaging with the backlight chassis of the light guide plate, has the shape that protrudes outside the light guide plate, and the light from the light source is not blocked by the engagement structure and is not unevenly reflected (irregular reflection) at the portion where the cutout and the like are formed, accordingly, it is possible to alleviate the brightness unevenness of the planar light output from the output portion.

Besides, by inserting the leg member into the holding portion, it is possible to position the light guide plate in the backlight chassis with high accuracy, accordingly, it is possible to output the planar light from the output portion to the region of the liquid crystal display device where the image display is performed.

Besides, the light guide plate is mountable in the backlight chassis in the correct direction, accordingly, the light reception portion is disposed correctly to oppose the light source, and it is possible to receive the light from the light source by means of the light reception portion with no loss. According to this, it is possible to increase the brightness of the planar light output from the backlight unit.

Further, in the above embodiments, the equal number of the LED lamps, that is, the light sources, are disposed at the left and right of the light guide plate; however, because of restriction on the space and a device mounted on the backlight unit, there is a case where it is impossible to perform the disposition with good balance. In this case as well, also, the light guide plate has the structure which includes the leg member that protrudes from the rectangular parallelepiped, accordingly, the structure is simple and the production is easy. Besides, the light guide plate has the simple structure, accordingly, the optimum designing for efficiently transmitting the light in the light guide plate is easy. Besides, it is possible to alleviate the light guide plate rotating and the light guide plate being mounted in the backlight chassis in a different direction. According to this, it is possible to easily demonstrate the performance of the optimized light guide plate.

Industrial Applicability

The present invention is usable as a display device of apparatuses such as a flat-screen television device, a flat-screen display device, a mobile phone and the like.

Reference Signs List 1 liquid crystal display panel
2 backlight unit
3 optical sheet unit
4 backlight chassis (chassis)
41 rear surface portion
411 holding portion
42 side wall portion
43 reflection sheet
5 light guide plate
51 light reception portion
52 output portion
53 mounted portion
531 leg member
6 LED lamp
7 light guide plate
70 light guide member
701 light reception portion
703 mounted portion
704 leg member

The invention claimed is:

1. A backlight unit comprising:
a chassis;
a light source that is mounted in the chassis; and
a rectangular parallelepiped light guide plate that is mounted in the chassis, receives light from the light source via a side end surface, and outputs the light as planar light from a front output portion which is a surface of the light guide plate perpendicular to the side end surface; wherein
the light guide plate includes a plurality of leg members that protrude from a mounted portion that is a surface opposite to the output portion;
the chassis includes holding portions into which the leg members are inserted;
at least one set of the plurality of leg members is disposed at symmetrical positions with respect to a center of the mounted portion; and
a cross-sectional shape of each one of the at least one set of the plurality of leg members taken along a surface parallel or substantially parallel to the mounted portion is not point-symmetrical about a center of the cross-sectional shape.

2. The backlight unit according to claim 1, wherein
the light guide plate and the plurality of leg members are formed integrally with each other.

3. The backlight unit according to claim 2, wherein
the plurality of leg members are not-insertable into the holding portion when the light guide plate is rotated 180° about an axis that passes through a center of the mounted portion and meets the mounted portion at right angles.

4. The backlight unit according to claim 2, comprising two or more kinds of leg members that have cross-sectional shapes, taken along a surface parallel or substantially parallel to the mounted portion, which are different from each other.

5. The backlight unit according to claim 2,
the light guide plate has a structure that is dividable into a plurality of light guide members; and
the light guide members each have two or more leg members.

6. The backlight unit according to claim 1, wherein
the plurality of leg members are attachable to and detachable from the light guide plate.

7. The backlight unit according to claim 6, wherein
the plurality of leg members are not-insertable into the holding portion when the light guide plate is rotated 180° about an axis that passes through a center of the mounted portion and meets the mounted portion at right angles.

8. The backlight unit according to claim 1, wherein
the plurality of leg members are not-insertable into the holding portion when the light guide plate is rotated 180° about an axis that passes through a center of the mounted portion and meets the mounted portion at right angles.

9. The backlight unit according to claim 8, comprising two or more kinds of leg members that have cross-sectional shapes, taken along a surface parallel or substantially parallel to the mounted portion, which are different from each other.

10. The backlight unit according to claim 8,
the light guide plate has a structure that is dividable into a plurality of light guide members; and
the light guide members each have two or more leg members.

11. The backlight unit according to claim 1, comprising two or more kinds of leg members that have cross-sectional shapes, taken along a surface parallel or substantially parallel to the mounted portion, which are different from each other.

12. The backlight unit according to claim 1,
the light guide plate has a structure that is dividable into a plurality of light guide members; and
the light guide members each have two or more leg members.

13. The backlight unit according to claim 1, wherein
the holding portion includes a through-hole.

14. The backlight unit according to claim 1, wherein
the holding portion includes a closed concave hole.

15. A liquid crystal display device that uses a backlight unit according to claim 1.

16. A backlight unit comprising:
a chassis;
a light source that is mounted in the chassis; and
a rectangular parallelepiped light guide plate that is mounted in the chassis, receives light from the light source via a side end surface, and outputs the light as planar light from a front output portion which is a surface of the light guide plate perpendicular to the side end surface; wherein
the light guide plate includes a plurality of leg members that protrude from a mounted portion that is a surface opposite to the output portion, the plurality of leg members including two or more kinds of leg members that have cross-sectional shapes, taken along a surface parallel or substantially parallel to the mounted portion, which are different from each other; and
the chassis includes holding portions into which the leg members are inserted.

17. The backlight unit according to claim 16, wherein
the plurality of leg members are not-insertable into the holding portions when the light guide plate is rotated 180° about an axis that passes through a center of the mounted portion and meets the mounted portion at right angles.

18. The backlight unit according to claim 16,
the light guide plate has a structure that is dividable into a plurality of light guide members; and the plurality of light guide members each include two or more of the plurality of leg members.

19. The backlight unit according to claim 16, wherein the holding portion includes a through-hole.

20. The backlight unit according to claim 16, wherein the holding portion includes a closed concave hole.

* * * * *